Oct. 23, 1956  B. D. BEAMISH  2,767,823
CONVEYOR SYSTEM
Filed Jan. 29, 1953  4 Sheets-Sheet 1
FIG. I.
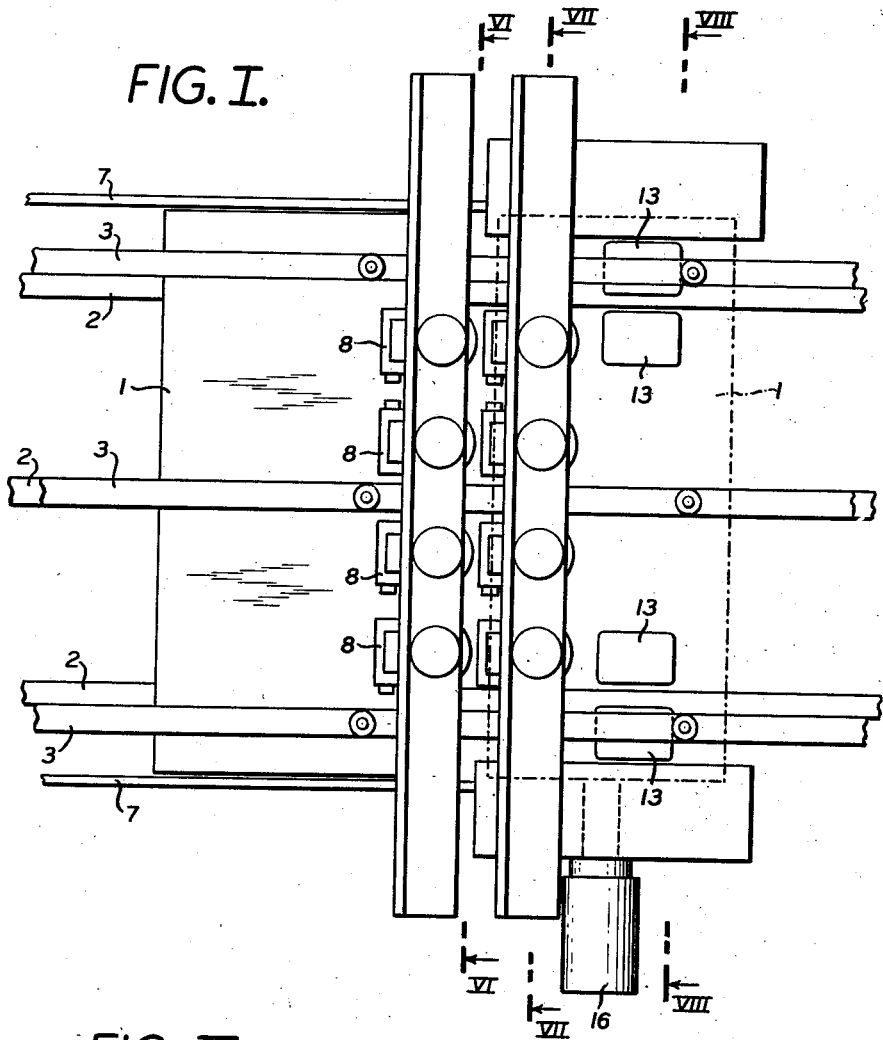
FIG. III.
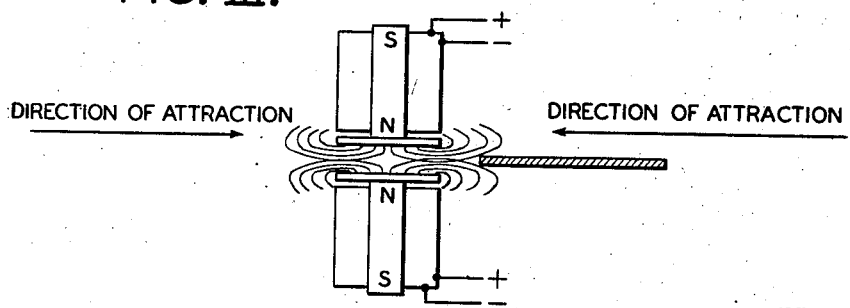
DIRECTION OF ATTRACTION  DIRECTION OF ATTRACTION
INVENTOR
BERNARD DELACOUR BEAMISH.
BY
ATTORNEYS.

Oct. 23, 1956
B. D. BEAMISH
2,767,823
CONVEYOR SYSTEM
Filed Jan. 29, 1953
4 Sheets-Sheet 2
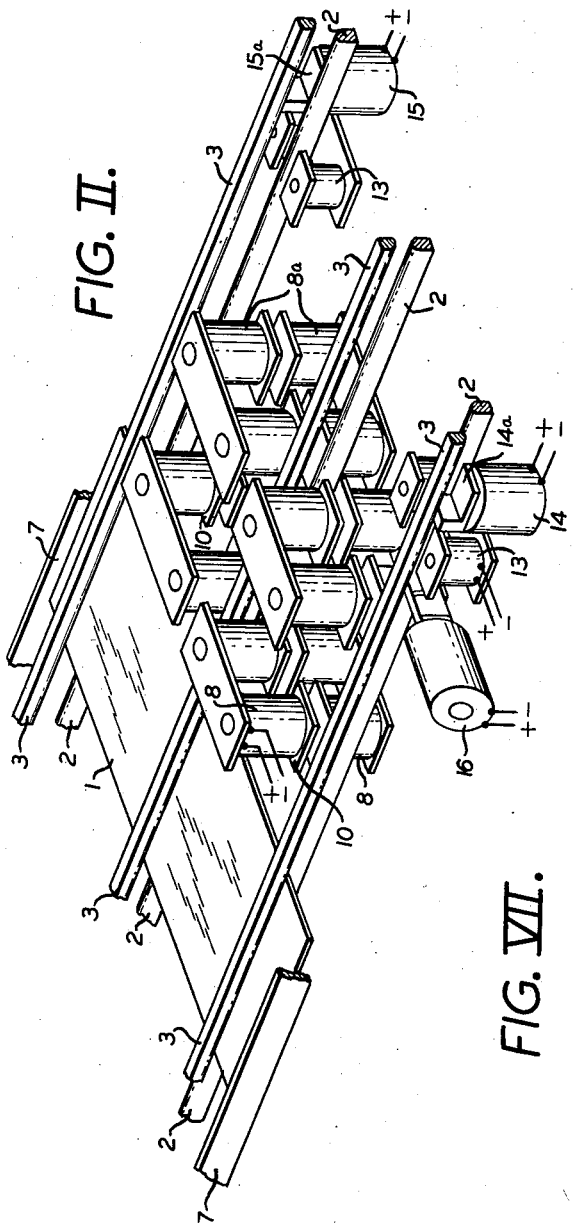
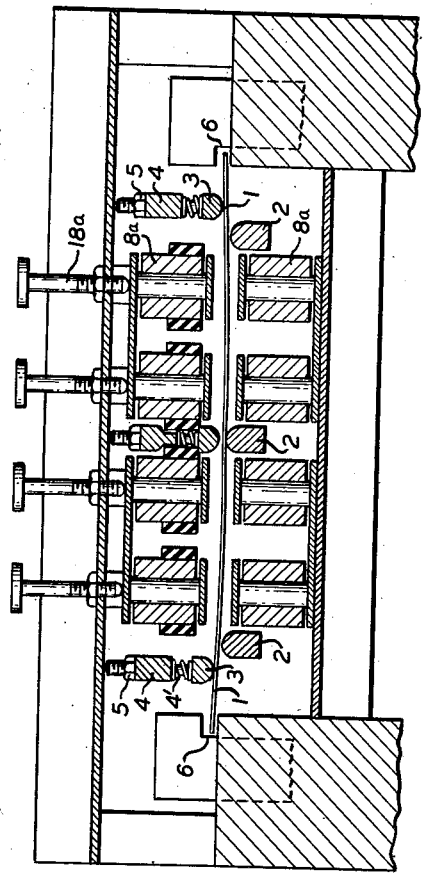
INVENTOR
BERNARD DELACOUR BEAMISH.
BY
Moors, Nolte, Crews + Berry.
ATTORNEYS.

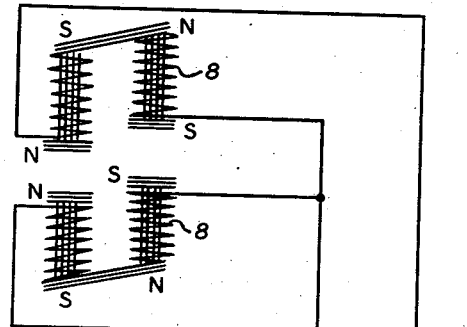
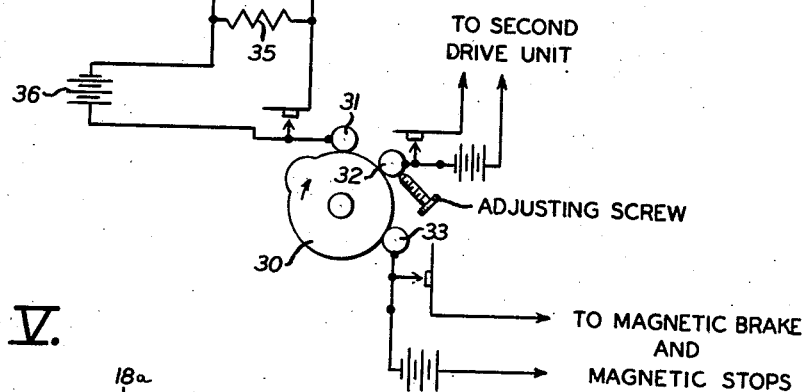
FIG. IV.
FIG. V.
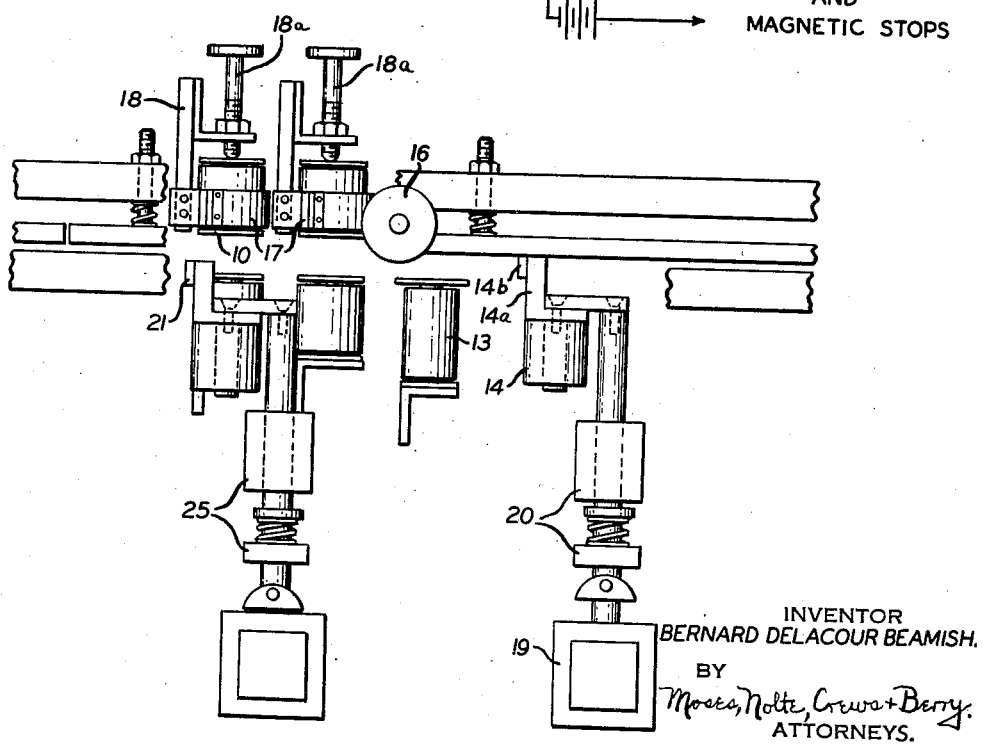
INVENTOR
BERNARD DELACOUR BEAMISH.
BY
Moors, Nolte, Crews + Berry.
ATTORNEYS.

Oct. 23, 1956  B. D. BEAMISH  2,767,823
CONVEYOR SYSTEM
Filed Jan. 29, 1953
4 Sheets-Sheet 4
FIG. VI.
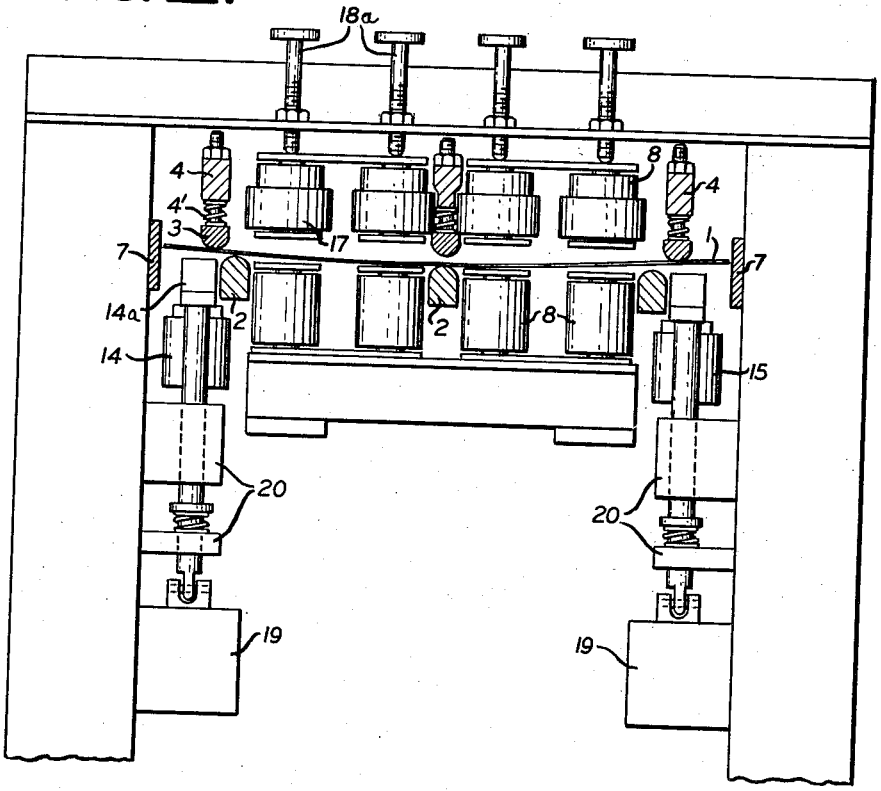
FIG. VIII.
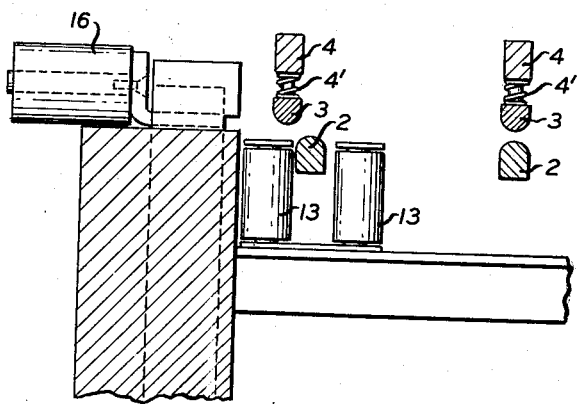
INVENTOR
BERNARD DELACOUR BEAMISH.
BY
Moses, Nolte, Cruws + Berry.
ATTORNEYS.

United States Patent Office 2,767,823
Patented Oct. 23, 1956

2,767,823

CONVEYOR SYSTEM

Bernard Delacour Beamish, New Rochelle, N. Y.

Application January 29, 1953, Serial No. 333,977

5 Claims. (Cl. 198—41)

This invention relates to conveyor systems, and more particularly to conveyor systems in which the object is conveyed under a magnetic transfer system.

In the high speed manufacture of tin can bodies, it is the practice to perform a series of punch press operations on a flat or slightly curved tin plated steel blank, the length of which is approximately the circumference of the can and the width of which is approximately the height of the can. These blanks are customarily fed from one press station to the next by reciprocating feed fingers which push the blanks against predetermined stops. On the return action of the feed fingers which is horizontal, the fingers spring open so as not to draw the can blanks backwards, and the can blanks are restrained from traveling backwards by hold-down springs. As the speed of body making machines has increased, this mechanism becomes continually more difficult to adjust, and maladjustment damages the edges of the tinplate bodies, and results in incorrect indexing at the press stations. The difficulty of adjusting this feed mechanism has become a serious limiting factor in the increased speed of operation of can bodymakers.

The present invention is a magnetic system of transfer of bodyblanks from one station to another. Acceleration is provided entirely by magnetic force and deceleration is provided by the magnetic braking of the blank. The blank is positioned for the subsequent press operation by being drawn up against temporarily magnetized stops, but is prevented by the aforesaid braking action from striking these stops with a damaging force. Thus, there is no mechanical action upon the edges of the blank which would damage it or cause misindexing due to faulty register on the stops. The acceleration applied to the tinplate blank is proportional to the magnetic flux applied to it up to the limit of its saturation. Within the limits of saturation of a tinplate of .0011" in thickness is found sufficient acceleration to provide a movement of 5" to 7", (the normal space between press stations in a bodymaking machine) in a period of 1/15 second or less; a greater speed than is customary on mechanical feeds. The present invention, therefore, permits faster can blank feed without danger of damage to the blanks, and at the same time eliminates the need for the complex high-speed reciprocating system of feed bars, fingers, etc., substituting fired electro-magnetic elements actuated by rapid timed pulses of direct current.

In the drawings:

Fig. I is a plan view of my device;

Fig. II is an isometric view of the device;

Fig. III is a diagram illustrating the magnetic lines of force of each drive unit;

Fig. IV is a diagram illustrating the means whereby the different units are actuated;

Fig. V is a front elevation of the device shown in Fig. I, but omitting the side for better illustration of other parts;

Fig. VI is a side elevation of one-half of the device shown in Fig. I taken on line VI—VI;

Fig. VII is a side elevation taken on lines VII—VII of Fig. I;

Fig. VIII is a side elevation taken on lines VIII—VIII of Fig. I.

This adaptation of my device is illustrated to show two drive units, a braking unit and magnetic stops. However, it must be understood that many variations of my invention may be made without departing from the scope thereof.

The can blank 1 is in the position shown in Fig. I, having arrived at this position from a previous station in the sequence, brought there either by a similar magnetic feed or, in the event that the first press station is preceded by a flexing station, having been placed there by the flexer. The can blank rests upon non-magnetic rails 2 running longitudinal to the flow of work in the machine. Above the blank are nonmagnetic rails marked 3, which are in position above the lower rails so as to form a slot for the passage of the blank.

The tinplate blank 1 is shown not as a perfectly flat blank, but as a slightly upward curving blank, such curvature being the result of a preflexing operation, and being slightly varied due to minute variations in the temper of the tinplate in the blank. The upper rails 3 are supported from supporting rails 4 with springs 4', so as to permit them to rise slightly with the pressure of the spring in the tinplate. When not supported by the upward pressure of the tinplate, they are stopped in such a manner by adjustable stops 5 as always to provide a slot substantially wider than the thickness of the blank so as to permit a free passage of the blank. The upper supporting bars 4 can be adjusted to the approximate position according to the amount of spring in the blank, so as to minimize the friction on the rails. The purpose of the spring supports for the upper rails 3 is to minimize the differences in friction as between one blank and another due to the curvatures arising from difference in temper.

The purpose of the entire rail system is to permit free passage of the blanks with minimum friction, but at the same time hold the blanks sufficiently flat so that they will enter the dies of the various press stations. Throughout its longitudinal travel, the outer edges of the blank are restrained by vertical side walls 6, which may be part of the die in each station, or separate restraining walls 7. The purpose of these restraining side walls is to prevent the blank from twisting during travel. If the leading edge of the blank is not presented to the drive magnets absolutely parallel to the line of the magnetic poles, there is a tendency for the end of the blank which is nearer to the drive magnets to be drawn forward faster, which again increases the pull on it and this is apt to cause a sluing action. This sluing effect, however, can be completely counteracted by side walls as above noted. These side walls are sufficiently close to the blank so as to allow for slight play.

The first drive unit consists of a line of electro-magnetic coils 8 spaced apart and transverse to the rails 2 and 3. These magnets are shown connected in pairs so as to produce a series of horseshoe magnets with alternate north and south poles facing the slot and connected by external pole pieces to form horseshoes. The poles of the magnets are provided with soft iron shoes. At least two identical sets of magnets are provided in the unit, one set mounted above the slot with poles facing downward, and the other set below the slot with poles facing upward.

It is of the greatest importance that the opposing poles above and below should be of the same polarity; that is to say, upper and lower north poles and upper and lower south poles are face to face so that when at rest and not moving the tin plate, the effect of the magnetic flux is to force apart the two upper and lower magnetic units. It is found that this particular juxtaposition of the poles alters the shape of the magnetic flux in such a fashion as to induce a lateral movement of the blank at right angles to the magnets and between the upper and lower sets. This action is shown in Figure III. The lower magnets are set so as to provide a space of approximately 1/8" between the blank when riding on the lower rails, and the magnet shoes. The upper magnets are vertically adjustable so that when a blank lies between them, upward attraction can nicely balance downward attraction, so that to as great a degree as possible, the blank floats between the two magnetic forces. The upper magnets are supported by fiber collars 17 from supporting member 18 connected to adjusting post 18a. The coils 8 of the magnets are connected in parallel, taking care to arrange the poles as described heretofore, and the entire circuit is connected to a source 36 of D. C. power with an arrangement for providing a pulse of energy (see Fig. IV).

The duration of this pulse should be capable of minute adjustment. This pulse may be provided by a cam 30 of consistent pattern driven by a variable speed motor, subject to close control. In the form shown in Fig. IV the pulse is obtained by a constant speed motor driving cam 30. The timing between the various magnetic drive units, the retarder and braking units may be varied by adjustment of the cam follower 31—33 relative to each other about the circumference of the cam 30. In this manner the various circuits are energized or deenergized at the appropriate instant.

Among the other methods by which energization may be accomplished are by an electronic timer or by thyratron or ignitron circuits. In the event that micro-switches or other mechanical switching is used, the inductance load of the magnets would have sufficient capacitance 34 and resistance 35 across the circuit to accommodate the inductive pulse consequent on breaking the circuit, so as not to damage the switches.

The pole pieces 10 of the first drive unit are lined up parallel and near the leading edge of the blank.

Next in series along the rails is the second drive unit 8a, exactly similar to the first drive unit 8, except that the position of the poles is alternated, a south pole following a north pole of the first drive unit but once again, the upper and lower poles which face each other must be of similar polarity, and if desirable, a third drive unit can be inserted between the second drive unit and the brake unit to be described. The spacing of the drive units is determined by the friction in the particular feed system laid out, and their number is determined by the length of stroke required by the press stations.

Following the final drive unit are brake units 13, consisting of similar magnets, but only in the lower tier. Whereas the magnets in the drive units are bunched somewhat toward the center of the conveyor, the magnets in the brake unit 13 are disposed near to the edges. The reason for this is that whereas the action of the drive unit may be to turn the blank in the event that due to inequality of the friction, it is presented to the drive unit not quite square, the action of the brake unit is to correct this twisting inasmuch as that end of the leading edge of the blank which first arrives in the brake position will be subject to greater braking than the other end of the blank which trails it.

Immediately following the brake unit 13 are the magnetized stops 14, 15, which are two electro-magnets, but having shoes 14a, 15a turned at right angles to the magnet face and projecting upwards so that these magnets may be mounted out of the way of succeeding drive units, not shown. The tops of the pole pieces 14a, 15a are rigidly positioned in their fore and aft direction, and provide magnetized stoppage indexing the leading edge of the blank at two points. The faces of these pole pieces which the blank contacts are covered or plated with a thin layer of some non-magnetic material 14b such as tungsten carbide or stainless steel, so that when the current is released on these pole pieces, the tinplate will not be in actual contact with the magnetized iron, and there will be no effect of sticking from residual magnetism in the iron. It is desirable that the stop surfaces be of a hard material so as to maintain their accuracy notwithstanding the many million blows from can blanks. Magnetic stops 14 and 15 while left in a horizontal plane are arranged to have a short vertical stroke so that at the end of the action in each press station, they may be dropped out of the path of the blank after the specific operation of that station has been accomplished, and the blank may move onto a successive station. This is accomplished by the action of solenoid 19 through supporting brackets 20. It may be noted that the can blank 1 is illustrated in dotted outline at the right side of Fig. I. It is at this position that the press operation takes place. At this specific instance, the blank is in position for the cover cutting operation. Since the operation is performed by standard equipment it is not shown. Also shown are stops 21, Fig. V just below the leading edge of the blank in its first position. These are stops appropriate to the previous unit of the conveyor system. Stop 21 is shown in the open position while stop 14 is shown in the closed position ready to position the blank.

A third magnetic stop 16 is mounted on one side of the conveyor so as to index the blank on one lateral edge. The blank is thus indexed at three points—two on the leading edge and one on one side edge, which places it in accurate position for the press operation.

The operation of the device is as follows: The stops 21 are demagnetized and drawn downwardly under the action of solenoid and supporting bracket 25 which are similar to solenoid 19 and bracket 20, the first drive unit magnets 8 are then energized. The blank is then accelerated into the first drive unit. At some later instant this first drive unit is demagnetized. This instant takes place when the drive unit no longer accelerates the blank in the forward direction, but commences to decelerate it as the center of the blank passes the center of the magnetic flux of the drive unit. At this time the travel of the blank is taken over by the second drive unit. The timing of the energization and deenergization of the first drive unit 8a is critical; in the second drive unit, the timing of the energization is not critical but should anticipate the entry of the leading edge of the blank into its magnetic field. The instant of deenergization of the second drive unit is also critical, being the instant at which acceleration by this unit is finished.

The action of the brake unit 13 is to draw the blank down upon the lower rails 2 so as to provide a braking action and to decelerate the blank so it will not be damaged by striking the stops with too much speed. This brake, however, should not be such as to impede the continuous movement of the blank toward the stops. The timing of the brake unit is not critical. It may be energized at any point prior to the arrival of the blank for braking, and it may either be deenergized after completion of the feed stroke of the press or maintained throughout the subsequent press operation in order to hold the blank firmly down upon the die. If it is desirable to force a curved blank completely flat during the pressing operation or to induce the outward edges of the blank to enter an auxiliary pair of upper rails for this purpose, the brake magnets may be particularly arranged and timed for this purpose.

I have described what I believe to be the best embodiments of my invention. I do not wish, however, to be confined to the embodiments shown, but what I desire to cover by Letters Patent is set forth in the appended claims.

I claim:
1. In a magnetic transfer system for thin metal blanks, a plurality of lower rails, a plurality of upper rails positioned above said lower rails to form a passageway for said thin metal blanks therebetween, said upper and lower rails extending longitudinally of the direction of transfer of said blanks, at least one electro-magnetic drive unit straddling said rails, an electro-magnetic braking unit having a pair of poles and means for positioning said braking unit with its poles adjacent said passageway, at least a pair of movable magnetic stops positioned to intercept the metal blank, said stops including means enabling them to be moved from the intercepting position to allow free passage of said blank along said passageway and means for energizing the drive unit, the braking unit and the magnetic stops in timed relationship.

2. The invention as set forth in claim 1, wherein said electro-magnetic drive units comprising at least two pairs of horseshoe electro-magnets, one pair above said passageway, the other below said passageway, and having their like poles opposing each other.

3. The invention as set forth in claim 2, including an electro-magnet at one side of said passageway and means for energizing said electro-magnet along with said pair of movable stops thereby positioning said blank.

4. The invention as set forth in claim 3, wherein said energizing means includes a timing device adapted to sequentially operate the drive units, the braking unit and the magnetic stops.

5. In a magnetic transfer system for thin metal blanks, as set forth in claim 1, side rails mounted along the two sides of said passageway to prevent skewing of said blank.

References Cited in the file of this patent
UNITED STATES PATENTS

| 282,165   | Cheever  | July 31, 1883 |
| 1,020,942 | Bachelet | Mar. 19, 1912 |